(12) United States Patent
Andreas-Schott et al.

(10) Patent No.: US 8,956,779 B2
(45) Date of Patent: Feb. 17, 2015

(54) SEALED WATER VAPOR TRANSFER UNIT ASSEMBLY WITH INTEGRATED LOAD TRANSFERRING STRUCTURE

(75) Inventors: Benno Andreas-Schott, Pittsford, NY (US); Glenn W. Skala, Churchville, NY (US); Thomas P. Migliore, Rochester, NY (US); Ian R. Jermy, Leroy, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1996 days.

(21) Appl. No.: 11/695,076

(22) Filed: Apr. 2, 2007

(65) Prior Publication Data
US 2008/0241636 A1 Oct. 2, 2008

(51) Int. Cl.
*H01M 2/38* (2006.01)
*H01M 2/40* (2006.01)
*H01M 8/24* (2006.01)
*H01M 8/04* (2006.01)
*H01M 8/10* (2006.01)

(52) U.S. Cl.
CPC ...... *H01M 8/04149* (2013.01); *H01M 8/04007* (2013.01); *H01M 2008/1095* (2013.01); *Y02E 60/50* (2013.01)

USPC ............ 429/460; 429/452; 429/467; 429/469

(58) Field of Classification Search
USPC .................................... 429/436, 469
See application file for complete search history.

(56) References Cited

U.S. PATENT DOCUMENTS

| | | | |
|---|---|---|---|
| 5,382,478 A * | 1/1995 | Chow et al. ................... | 429/414 |
| 5,484,666 A * | 1/1996 | Gibb et al. .................... | 429/434 |
| 5,858,569 A * | 1/1999 | Meacher et al. .............. | 429/413 |
| 6,248,462 B1* | 6/2001 | Bonville ........................ | 429/435 |
| 6,372,372 B1* | 4/2002 | D'Aleo et al. ................ | 429/434 |
| 7,138,197 B2 | 11/2006 | Forte et al. | |
| 2001/0046616 A1* | 11/2001 | Mossman ........................ | 429/13 |
| 2003/0044663 A1* | 3/2003 | Ballantine et al. .............. | 429/26 |
| 2006/0263654 A1 | 11/2006 | Goebel et al. | |

* cited by examiner

*Primary Examiner* — Ula C. Ruddock
*Assistant Examiner* — Archer Dudley
(74) *Attorney, Agent, or Firm* — Fraser Clemens Martin & Miller LLC; James D. Miller

(57) ABSTRACT

A water vapor transfer unit assembly is disclosed, the water vapor transfer unit assembly including a plurality of water vapor transfer units having a fluid permeable membrane and a plurality of supports disposed within a sealing frame adjacent an end plate of a fuel cell stack, wherein the sealing frame is adapted to provide support to the end plate and a fuel cell stack of the fuel cell stack system.

13 Claims, 5 Drawing Sheets

SEALED WATER VAPOR TRANSFER UNIT ASSEMBLY WITH INTEGRATED LOAD TRANSFERRING STRUCTURE

FIELD OF THE INVENTION

The invention relates to a fuel cell stack system and more particularly to a water vapor transfer unit assembly, the water vapor transfer unit assembly including a plurality of water vapor transfer (WVT) units, a sealing frame, and a plurality of supports, wherein the WVT units and the supports are disposed within the sealing frame and the supports are adapted to provide support to an end plate of a fuel cell stack of the fuel cell stack system.

BACKGROUND OF THE INVENTION

Fuel cell stack systems are used as a power source for electric vehicles, stationary power supplies, and other applications. One known fuel cell stack system is the proton exchange membrane (PEM) fuel cell stack system that includes a membrane electrode assembly (MEA) comprising a thin, solid polymer membrane-electrolyte having an anode on one face and a cathode on the opposite face. The MEA is sandwiched between a pair of electrically conductive contact elements which serve as current collectors for the anode and cathode, which may contain appropriate channels and openings therein for distributing the fuel cell stack system's gaseous reactants (i.e., $H_2$ and $O_2$ or air) over the surfaces of the respective anode and cathode.

PEM fuel cells comprise a plurality of the MEAs stacked together in electrical series while being separated by an impermeable, electrically conductive contact element known as a bipolar plate or current collector. The fuel cell stack systems are operated in a manner that maintains the MEAs in a humidified state. The level of humidity of the MEAs affects the performance of the fuel cell stack system. Additionally, if an MEA is operated too dry, the useful life of the MEA can be reduced. To avoid drying out the MEAs, the typical fuel cell stack systems are operated with the MEA at a desired humidity level, wherein liquid water is formed in the fuel cell during the production of electricity. Additionally, the cathode and anode reactant gases being supplied to the fuel cell stack system are also humidified to prevent the drying of the MEAs in the locations proximate the inlets for the reactant gases. Traditionally, a water vapor transfer (WVT) unit is utilized to humidify the cathode reactant gas prior to entering into the fuel cell. See, for example, U.S. Pat. No. 7,138,197 by Forte et al., incorporated herein by referenced in its entirety, a method of operating a fuel cell stack system incorporating a WVT unit.

Typical WVT units are located away from a cathode outlet and a cathode inlet of the fuel cell stack of the fuel cell stack system. Other fuel cell stack assemblies include WVT units incorporated into the end unit and adjacent the fuel cell stack. In these fuel cell stack systems, an end plate of the fuel cell stack is formed from a metal to provide support to the fuel cell stack. However, because the end plate is formed from a metal, the weight and thermal conductivity of the end plate is increased, thereby increasing the overall weight of the fuel cell stack system and increasing a warm up time of the fuel cell stack system due to heat losses.

It would be desirable to produce a water vapor transfer unit assembly adapted to provide support to an end plate of the fuel cell stack system to facilitate an integration of the water vapor transfer unit assembly with an end unit of a fuel cell stack system while minimizing the weight and thermal conductivity of the fuel cell stack system.

SUMMARY OF THE INVENTION

Concordant and congruous with the present invention a water vapor transfer unit assembly adapted to provide support to an end plate of the fuel cell stack system to facilitate an integration of the water vapor transfer unit assembly with an end unit of a fuel cell stack has been discovered.

In one embodiment, the water vapor transfer unit assembly comprises a sealing frame adapted to be disposed in a fuel cell stack system adjacent an end plate of a fuel cell stack thereof; a plurality of water vapor transfer units disposed in said sealing frame; and a plurality of supports disposed in said sealing frame intermediate said water vapor transfer units, wherein said supports cooperate with said sealing frame to support the end plate of the fuel cell stack.

In another embodiment, the lower end unit of a fuel cell stack comprises an end plate adapted to be disposed adjacent a bottom of the fuel cell stack; a sealing frame disposed adjacent said end plate; a plurality of water vapor transfer units disposed in said sealing frame; a plurality of supports disposed in said sealing frame intermediate said water vapor transfer units, wherein said supports cooperate with said sealing frame to provide support to said end plate; and a plurality of heat exchangers in fluid communication with said water vapor transfer units.

In another embodiment, the lower end unit of a fuel cell stack comprises an end plate adapted to be disposed adjacent a bottom of the fuel cell stack; a sealing frame disposed adjacent said end plate; a plurality of water vapor transfer units disposed in said sealing frame; a plurality of supports disposed within said sealing frame intermediate said water vapor transfer units, wherein said supports cooperate with said sealing frame to provide support to said end plate; a sealant disposed between said sealing frame and said water vapor transfer units to form a substantially fluid tight seal therebetween; and a plurality of heat exchangers in fluid communication with said water vapor transfer units.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
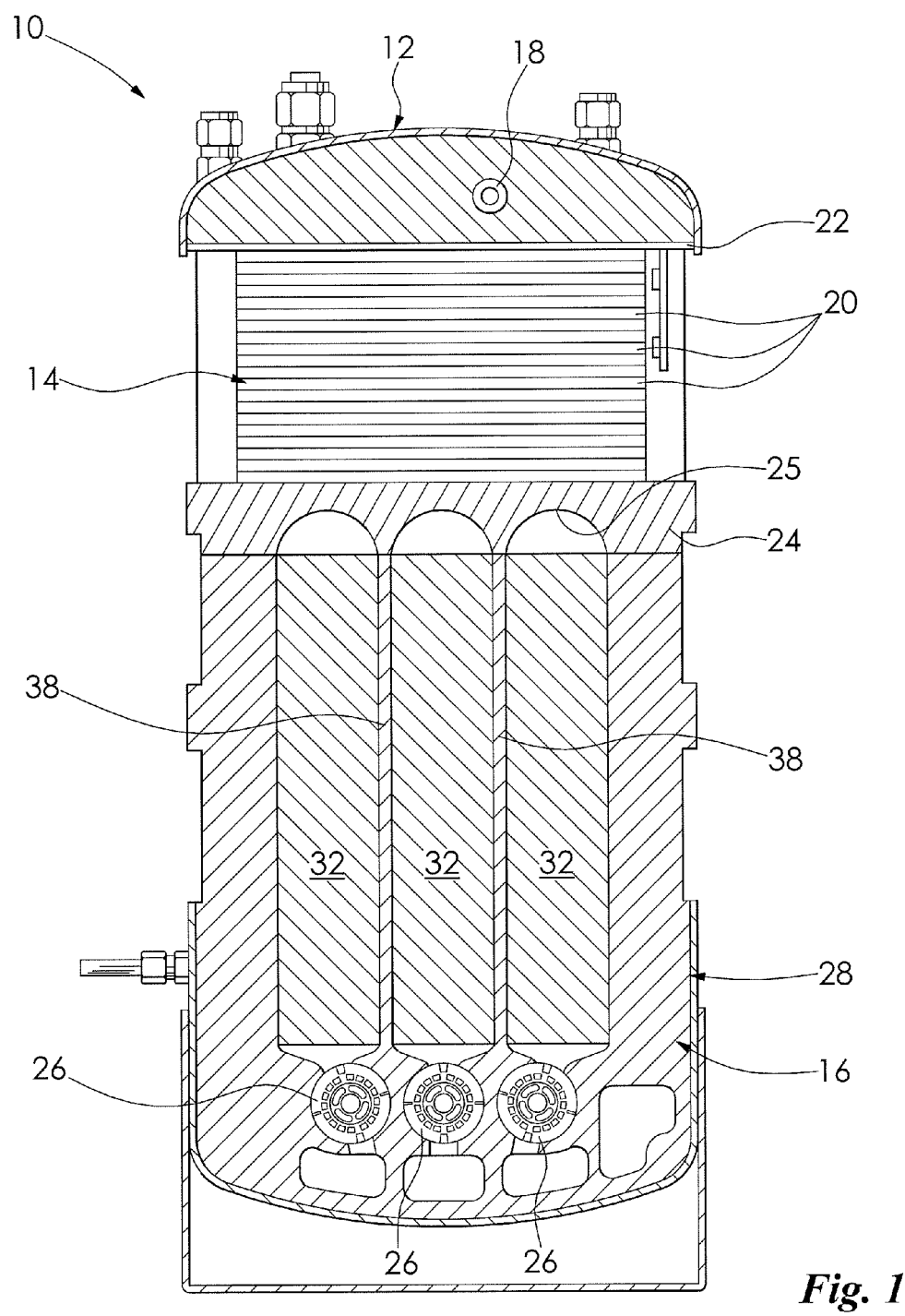
FIG. 1 is a cross-sectional elevational view of a fuel cell stack assembly including a lower end unit incorporating a water vapor transfer unit assembly according to an embodiment of the invention.

FIG. 1 shows a fuel cell stack system 10 including an upper end unit 12, a fuel cell stack 14, and a lower end unit 16. The upper end unit 12, the fuel cell stack 14, and the lower end unit 16 are assembled and compressed by a conventional compression retention system (not shown). The upper end unit 12 includes a coolant bypass system 18 in fluid communication with a coolant source (not shown) and the fuel cell stack 14. The coolant bypass system 18 is adapted to circulate a coolant (not shown) through the fuel cell stack system 10.

The fuel cell stack 14 includes a plurality of fuel cell assemblies 20, a top end plate 22 adjacent the upper end unit 12, and bottom end plate 24 adjacent the lower end unit 16. The bottom end plate 24 forms cathode flow passages 25 in fluid communication with the fuel cell stack 14 and the lower end unit 16. In the embodiment shown, the bottom end plate 24 is formed from a polymeric material. The fuel cell assemblies 20 may be any conventional fuel cell assembly such as a proton exchange membrane (PEM) assembly that includes a membrane electrode assembly (MEA) comprising a thin, solid polymer membrane-electrolyte having an anode on one face and a cathode on an opposite face.

The lower end unit 16 is disposed below the fuel cell stack 14 of the fuel cell stack system 10 and abuts the bottom end plate 24. The lower end unit 16 includes heat exchangers 26 and a water vapor transfer unit assembly 28. The heat exchangers 26 may be any conventional heat exchanger such as a shell-and-tube heat exchanger, for example, as desired.

Figure 2:
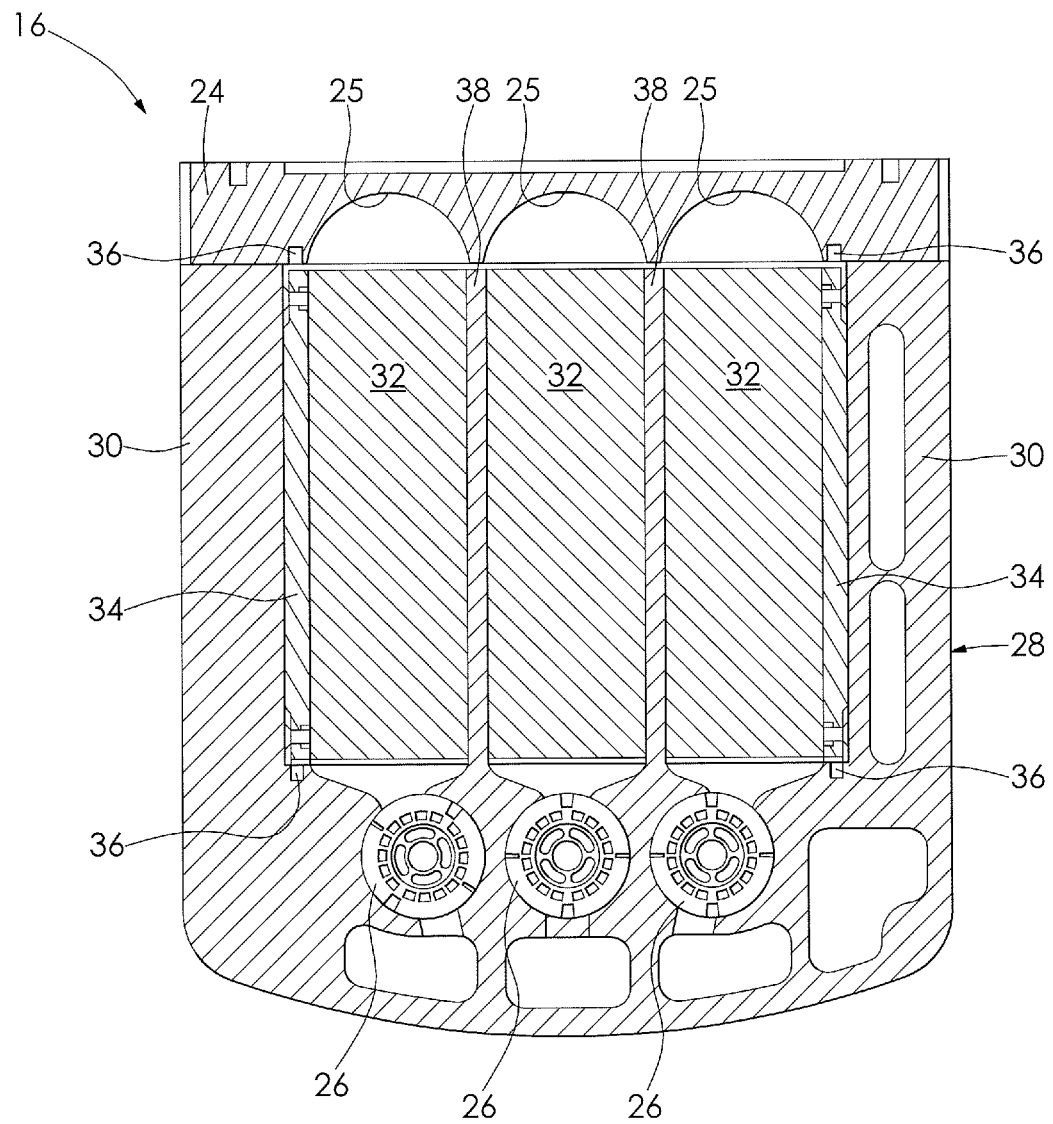
FIG. 2 is a cross-sectional elevational view of the lower end unit incorporating the water vapor transfer unit assembly shown in FIG. 1.
Figure 3:
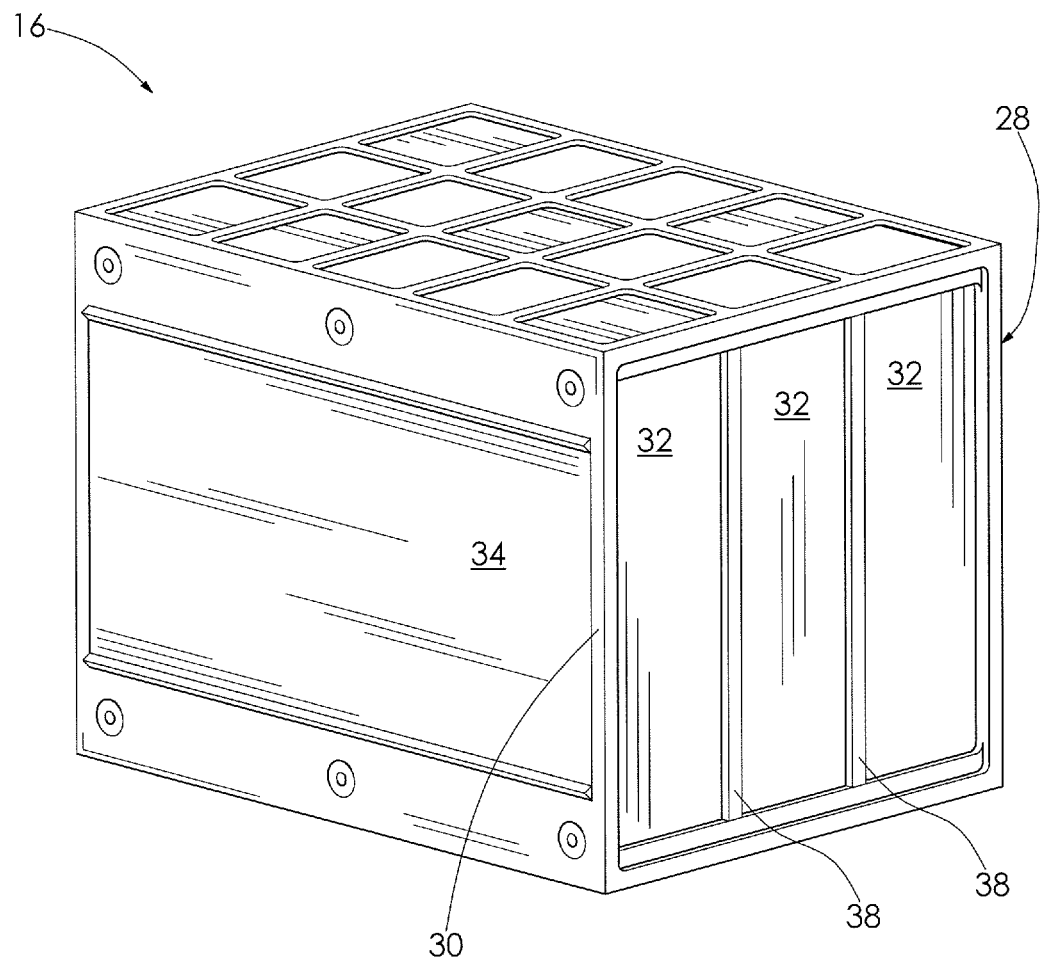
FIG. 3 is a perspective view of the water vapor transfer unit assembly shown in FIG. 2.

As shown in FIGS. 1-3, the water vapor transfer unit assembly 28 includes a sealing frame 30, water vapor transfer (WVT) units 32, end plates 34, a sealant 36, and supports 38. The water vapor transfer (WVT) units 32, the end plates 34, the sealant 36, and the supports 38 are disposed within the sealing frame 30. The sealing frame 30 has a substantially rectangular shape and is formed from a polymeric material such as a high-density polyethylene. It is understood that the sealing frame 30 may have any shape and may be formed from any material such as a polymer or a metal, for example, as desired. It is also understood that the sealing frame 30 may have covered side edges or may have open edges exposing the end plates 34, as desired.

Figure 4:
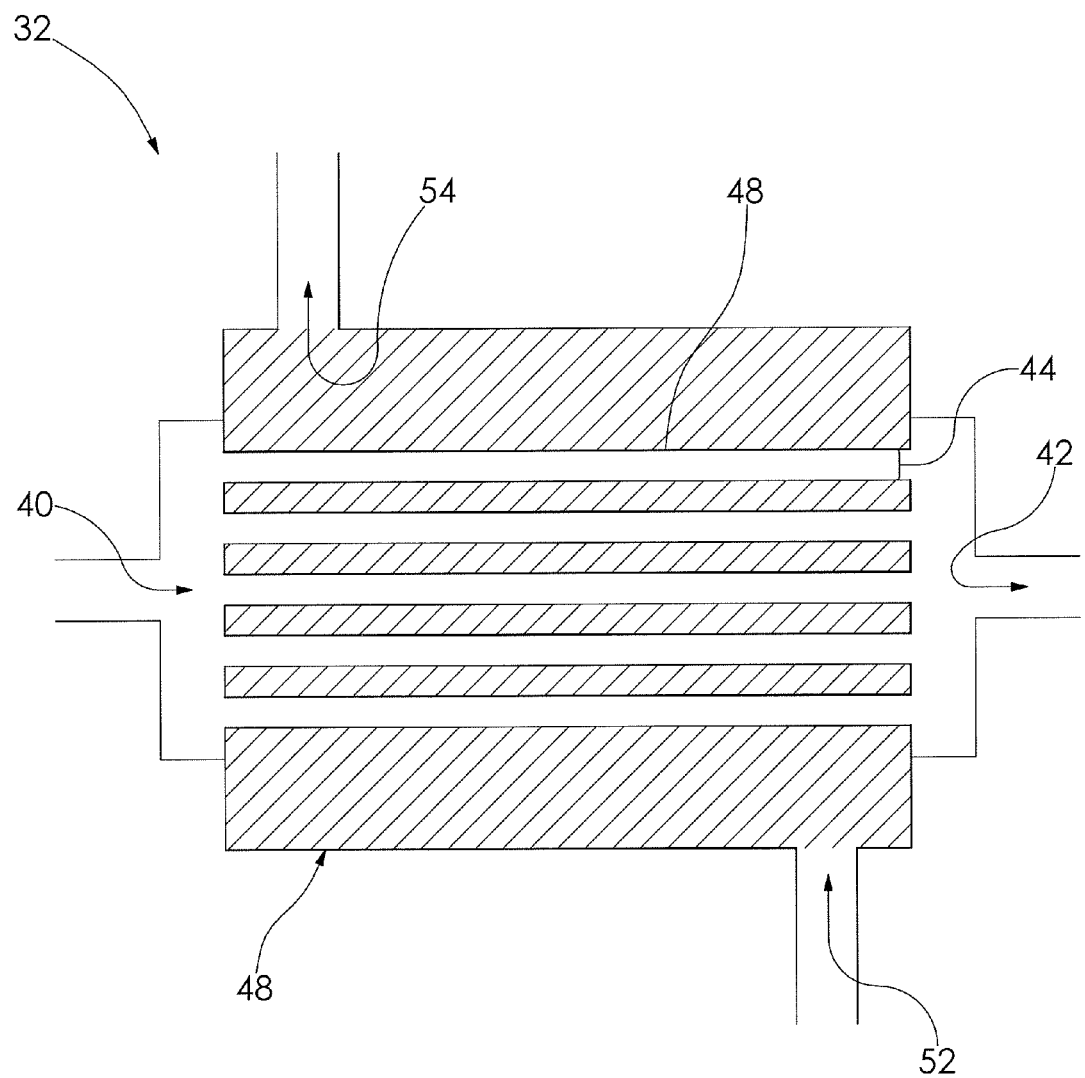
FIG. 4 is a schematic cross-sectional view of the water transfer unit shown in FIG. 1.

FIG. 4 illustrates a single WVT unit 32. The WVT unit 32 includes a primary gas inlet 40, a primary gas outlet 42, conduits 44 and a housing 48. In the embodiment shown in FIGS. 1-3, three WVT units 32 are shown, however more or fewer WVT units 32 may be disposed within the sealing frame 30 of the water vapor transfer unit assembly 28, as desired. The conduits 44 are formed from a water transferable membrane material. The water transfer membrane material forming the conduits 44 may be any material that allows the transfer of water vapor therethrough. Preferably, such material selectively allows the transfer of water vapor, without also allowing the transfer of other gasses. A preferred water transfer membrane selectively allows the transfer of water vapor from a stream of primary gas to a stream of secondary gas, without allowing significant passage (leaking) of other components from the primary gas stream to the secondary stream. The water transfer membrane material may be formed from a poly[perfluorosulfonic] acid, a sulfonated polystyrene, a polyethersulfone, a sulfonated polyetherketone, a polycarbonate, other sulfonated materials, or mixtures thereof, for example.

A first end of each conduit 44 is in fluid communication with the primary gas inlet 40 and a second end of each conduit 44 is in fluid communication with the primary gas outlet 42. The conduits 44 facilitate the flow of a primary gas (not shown) through the conduits 44. The housing 48 forms a void space around at least a portion of each of the conduits 44. A secondary gas inlet 52 and a secondary gas outlet 54 are in fluid communication with the housing 48 to facilitate the flow of a secondary gas through the void space adjacent an outer surface of the conduits 44. The conduits 44 may be any shape including substantially cylindrical or rectangular, as desired. In the embodiment shown, the primary gas has a higher humidity level than the secondary gas. However, the primary gas may have a lower humidity level than the secondary gas, if desired.

The end plates 34 are disposed within the sealing frame 30 and intermediate the sealing frame 30 and the WVT units 32 on opposing sides of the water vapor transfer unit assembly 28. In the embodiment shown, the end plates 34 are formed from a polymeric material, but may be formed from any material, as desired. It is understood that the end plates 34 may be disposed around four perimeter edges of the WVT units 32, as desired.

As shown in FIG. 2, the sealant 36 is a gasket disposed around a top perimeter portion of the WVT units 32 adjacent the lower end plate 24, and around a bottom perimeter portion of the WVT units 32 adjacent the heat exchangers 26. The sealant 36 forms a substantially fluid tight seal between the water vapor transfer unit assembly 28 and the fuel cell stack system 10. The sealant 36 may be formed from any conventional fuel cell compatible material such as a polymeric or metallic material, a chemical adhesive such as an epoxy resin, or a b-stage adhesive. It is understood that the sealant 36 may also be disposed between the WVT units 32 and the supports 38 and the sealing frame 30, as desired.

Figure 5:
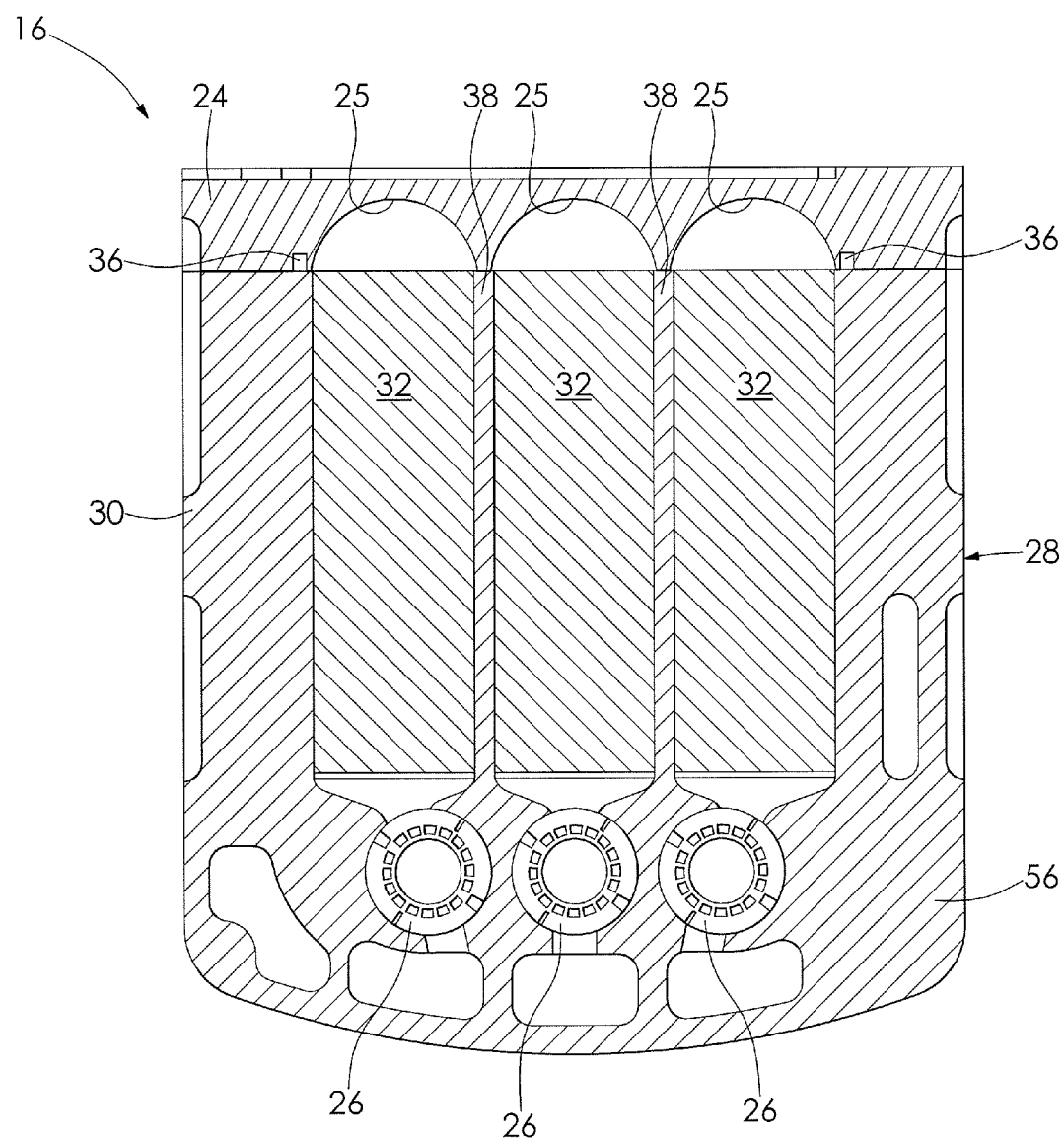
FIG. 5 is a cross-sectional elevational view of a lower end unit incorporating a water vapor transfer unit assembly according to another embodiment of the invention.

In the embodiment shown in FIGS. 1-3, the supports 38 are disposed within the sealing frame 30 intermediate the WVT units 32. The supports 38 shown are separately formed, but may be interconnected. The supports 38 are also shown as formed separately from the sealing frame 30, but may be integrally formed with the sealing frame 30, as desired. The supports 38 are shown as formed from a polymeric material. However, other materials can be used to form the supports 38 such as a metal, for example, as desired. In another embodiment, the supports 38 may be integrally formed with a bottom portion 56 of the lower end unit 16, as shown in FIG. 5.

To assemble the water vapor transfer unit assembly 28, the end plates 34 and the sealant 36 are disposed within a portion of a partially assembled sealing frame 30. Next, the WVT units 32 are disposed within the portion of the sealing frame 30 adjacent the end plates 34. At least one of the supports 38 is disposed intermediate adjacent WVT units 32 within the partially assembled sealing frame 30. If desired, additional sealant 36 may be applied to the supports 38 and the sealing frame 30 prior to installation of the WVT units 32. The sealing frame 30 is then fully assembled causing a required a compression of the components within the sealing frame 30. The compression caused by the end plates 34 on the WVT units 32 provides additional sealing of the membranes with supports 38 and the sealing frame 30.

Once fully assembled, the water vapor transfer unit assembly 28 may optionally be tested and leak checked prior to being installed in the lower end unit 16 of the fuel cell stack system 10. Additionally, the water vapor transfer unit assembly 28 may be further sealed with by disposing a face seal (not shown) on the perimeter edges of the water vapor transfer unit assembly 28 to cover the end plates 34 once the water vapor transfer unit assembly 28 is installed in the lower end unit 16.

Because the water vapor transfer unit assembly 28 includes the supports 38, the water vapor transfer unit assembly 28 may be disposed in the lower end unit 16 abutting the end plate 24 of the fuel cell stack 14. The supports 38 are adapted to be load-bearing members that provide support to the end plate 24 and the fuel cell stack 14. Additionally, because the supports 38 are the load-bearing members for the fuel cell stack 14, and not the end plate 24, the end plate 24 may be formed from a polymeric material rather than a metal. A polymeric bottom end plate 24 has a lower thermal mass and thermal conductivity as compared to metal end plates, and the polymeric end plate 24 thereby facilitates a more rapid warm up of the fuel cell stack system 10 while minimizing a heat loss through the end plate 24. Furthermore, by providing the supports 38 within the water vapor transfer unit assembly 28, the upper end unit 12 and lower end unit 14 of the fuel cell stack system 10 may be uniformly compressed by the compression system, thereby maximizing the sealing of the WVT units 32 and minimizing a complexity of an assembly and disassembly of the fuel cell stack system 10.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A lower end unit of a fuel cell stack comprising:
   an end plate;
   a sealing frame disposed adjacent said end plate;
   a plurality of water vapor transfer units disposed in said sealing frame;
   a plurality of supports disposed in said sealing frame between said water vapor transfer units, wherein said supports are load bearing members for the fuel cell stack and provide compressive load-bearing support to said end plate, and wherein said end plate is configured to be a non-load bearing member for the fuel cell stack; and
   a plurality of heat exchangers in fluid communication with said water vapor transfer units.

2. The lower end unit of claim 1, wherein said end plate is formed from one of a polymer and a composite.

3. The lower end unit of claim 1, wherein said supports are separately formed with said sealing frame.

4. The lower end unit of claim 1, wherein said supports are integrally formed with the lower end unit.

5. The lower end unit of claim 1, further including a sealant disposed between said sealing frame and said water vapor transfer units.

6. The lower end unit of claim 5, wherein the sealant cooperates with said sealing frame and said water vapor transfer units to create a substantially fluid tight seal.

7. The lower end unit of claim 1, wherein said sealing frame said sealing frame cooperates with said end plates to seal the water vapor transfer units with said sealing frame.

8. The lower end unit of claim 1, wherein the sealant is one of polymeric material, a metallic material, an epoxy resin, and a b-stage adhesive.

9. A lower end unit of a fuel cell stack comprising:
   an end plate;
   a sealing frame disposed adjacent said end plate;
   a plurality of water vapor transfer units disposed in said sealing frame;
   a plurality of supports disposed within said sealing frame between said water vapor transfer units, wherein said supports are load bearing members for the fuel cell stack and provide compressive load-bearing support to said end plate, and wherein said end plate is configured to be a non-load bearing member for the fuel cell stack;
   a sealant disposed between said sealing frame and said water vapor transfer units to form a substantially fluid tight seal therebetween; and
   a plurality of heat exchangers in fluid communication with said water vapor transfer units.

10. The lower end unit of claim 9, wherein said end plate is formed from one of a polymer and a composite.

11. The lower end unit assembly of claim 9, wherein the sealant is one of polymeric material, a metallic material, an epoxy resin, and a b-stage adhesive.

12. The lower end unit assembly of claim 1, wherein each of said heat exchangers is a shell-and-tube heat exchanger.

13. The lower end unit assembly of claim 1, wherein each of said heat exchangers is disposed within said sealing frame and is in fluid communication with one of said water vapor transfer units via an internal passage defined by said sealing frame.

* * * * *